US010059434B2

(12) United States Patent
Ito

(10) Patent No.: US 10,059,434 B2
(45) Date of Patent: Aug. 28, 2018

(54) AIRCRAFT HYDRAULIC VALVE

(71) Applicant: NABTESCO CORPORATION, Tokyo (JP)

(72) Inventor: Koji Ito, Gifu (JP)

(73) Assignee: Nabtesco Corporation, Tokyo (JP)

( * ) Notice: Subject to any disclaimer, the term of this patent is extended or adjusted under 35 U.S.C. 154(b) by 246 days.

(21) Appl. No.: 14/870,938

(22) Filed: Sep. 30, 2015

(65) Prior Publication Data

US 2016/0098045 A1 Apr. 7, 2016

(30) Foreign Application Priority Data

Oct. 1, 2014 (JP) .................................. 2014-202912

(51) Int. Cl.
| | | |
|---|---|---|
| *B64C 13/40* | (2006.01) | |
| *B64C 13/42* | (2006.01) | |
| *F15B 13/02* | (2006.01) | |
| *F15B 9/10* | (2006.01) | |
| *F16K 31/122* | (2006.01) | |

(52) U.S. Cl.
CPC .............. *B64C 13/40* (2013.01); *B64C 13/42* (2013.01); *F15B 9/10* (2013.01); *F15B 13/024* (2013.01); *F15B 13/027* (2013.01); *F16K 31/122* (2013.01); *F15B 2211/3058* (2013.01);
(Continued)

(58) Field of Classification Search
CPC ....... B64C 13/40; B64C 13/42; F15B 13/024; F15B 13/027; F15B 2211/3058; F15B 2211/50518; F15B 2211/5153; F15B 9/10; F16K 31/122; F16K 17/196; G05D 16/10;
(Continued)

(56) References Cited

U.S. PATENT DOCUMENTS

| | | | | |
|---|---|---|---|---|
| 3,194,261 A | * | 7/1965 | Tennis | .................... F15B 13/02 137/115.13 |
| 3,792,715 A | * | 2/1974 | Parrett | .................... F15B 11/04 137/493 |

(Continued)

FOREIGN PATENT DOCUMENTS

JP H06-144385 A 5/1994

OTHER PUBLICATIONS

Extended European Search Report as issued in European Patent Application No. 15187557.2, dated Mar. 2, 2016.

*Primary Examiner* — William McCalister
(74) *Attorney, Agent, or Firm* — Pillsbury Winthrop Shaw Pittman, LLP

(57) ABSTRACT

An aircraft hydraulic valve includes a housing, a check valve, a valve opening component, and an auxiliary hydraulic pressure supply mechanism. The housing includes a first port communicated with a first chamber of a hydraulic actuator, a second port communicated with a switch valve bypass-communicating a second chamber of the hydraulic actuator with the first chamber, and an oil channel connecting the first and second ports. The check valve interrupts oil flow from the first port to the second port. The valve opening component is configured to open the check valve with pilot pressure supplied from the second chamber. The auxiliary hydraulic pressure supply mechanism obtains hydraulic pressure, for opening the check valve, from a closed hydraulic pressure section, which is defined in the oil channel between the check valve and the first port.

9 Claims, 7 Drawing Sheets

(52) U.S. Cl.
CPC ............... *F15B 2211/50518* (2013.01); *F15B 2211/5153* (2013.01)

(58) Field of Classification Search
CPC ......... Y10T 137/7771; Y10T 137/7775; Y10T 137/7779; Y10T 137/778
See application file for complete search history.

(56) References Cited

U.S. PATENT DOCUMENTS

| | | |
|---|---|---|
| 3,943,968 A | 3/1976 | Treichler |
| 4,433,615 A * | 2/1984 | Vick ........................ F15B 13/01 137/106 |
| 4,518,004 A * | 5/1985 | Hsu ......................... F15B 13/02 137/115.18 |
| 5,174,189 A | 12/1992 | Kamimura |

\* cited by examiner

AIRCRAFT HYDRAULIC VALVE

CROSS-REFERENCE TO RELATED APPLICATIONS

This application is based upon and claims the benefit of priority from prior Japanese Patent Application No. 2014-202912, filed on Oct. 1, 2014, the entire contents of which are incorporated herein by reference.

FIELD

The present invention relates to an aircraft hydraulic valve adapted for use in a hydraulic servomechanism that controls a flight control surface of an aircraft.

BACKGROUND

A known flight control surface controller uses a plurality of hydraulic servomechanism systems that control fight control surfaces of an aircraft such as an elevator, a rudder, and an aileron. To provide the flight control surface controller with redundancy so that when a failure, such as a decrease in the pressure supplied from a hydraulic pressure source, occurs in one hydraulic servomechanism system, the flight control surface controller uses another hydraulic servomechanism systems to control the flight control surfaces.

Japanese Laid-Open Patent Publication No. 6-144385 describes an example of a conventional flight control surface controller including a plurality of hydraulic servomechanisms. Each hydraulic servomechanism includes a hydraulic valve located between a hydraulic actuator, which drives a flight control surface, and a switch valve, which allows for bypass communication of several hydraulic chambers of the hydraulic actuator. The hydraulic valve includes a check valve, which defines a closed oil channel (closed hydraulic pressure section) at the side of the hydraulic actuator, and a relief valve, which bypasses the check valve and releases oil from the hydraulic actuator side toward the switch valve. The check valve is closed by hydraulic pressure of the closed oil channel. The check valve opens when pushed by a valve opening component with a force that is greater than the hydraulic pressure of the closed oil channel.

SUMMARY

To increase the force for driving flight control surfaces in correspondence with enlargement of aircrafts and the flight control surfaces, the amount of oil that flows in the hydraulic servomechanisms needs to be increased. To satisfy this demand, the inventor of the present application has produced a device as a reference example including a hydraulic valve having an enlarged cross-sectional passage area and an enlarged check valve that opens and closes the oil channel. In the reference example, the check valve has an enlarged pressure receiving area in the closed oil channel, which is located at the hydraulic actuator side. This increases the force that closes the check valve. Thus, in the reference example, a pressure receiving area of a valve opening component, which opens the check valve, was enlarged in order to increase the force of the valve opening component. However, such an enlargement in the pressure receiving area of the valve opening component enlarges the valve opening component. This, in turn, enlarges the hydraulic valve.

It is an object of the present invention to provide an aircraft hydraulic valve that does not have to be significantly enlarged even when increasing the amount of oil flowing in a hydraulic servomechanism.

One aspect of the present invention is an aircraft hydraulic valve that includes a housing, a check valve, a valve opening component, and an auxiliary hydraulic pressure supply mechanism. The housing includes a first port adapted to communicate with a first hydraulic chamber of a hydraulic actuator that drives a flight control surface, a second port adapted to communicate with a switch valve capable of communicating a second hydraulic chamber of the hydraulic actuator with the first hydraulic chamber via a bypass, and an oil channel that connects the first port and the second port. The check valve interrupts a flow of oil from the first port to the second port in the oil channel of the housing. The valve opening component is configured to open the check valve with pilot pressure supplied from the second hydraulic chamber. The auxiliary hydraulic pressure supply mechanism obtains hydraulic pressure, for opening the check valve, from a closed hydraulic pressure section, which is defined in the oil channel between the check valve and the first port.

In this structure, when the switch valve communicates the first hydraulic chamber with the second hydraulic chamber via the bypass, pilot pressure is supplied from the second hydraulic chamber to the valve opening component. Thus, force acts to move the valve opening component in a direction in which the check valve opens. When the force moving the valve opening component is larger than a force that closes the check valve, the valve opening component opens the check valve. Consequently, oil is supplied from the first hydraulic chamber to the second hydraulic chamber through the first port and the second port.

Additionally, other than the pilot pressure supplied from the second hydraulic chamber to the valve opening component, the auxiliary hydraulic pressure supply mechanism obtains hydraulic pressure for opening the check valve. For example, the auxiliary hydraulic pressure supply mechanism supplies the obtained hydraulic pressure to the valve opening component. This increases the force moving the valve opening component in a direction in which the check valve opens. Alternatively, the auxiliary hydraulic pressure supply mechanism supplies the obtained hydraulic pressure to a surface of the closed check valve, which is located at the side of the second port. This decreases the force closing the check valve.

Therefore, when the aircraft hydraulic valve of the above aspect is compared to a hydraulic valve that lacks the auxiliary hydraulic pressure supply mechanism, the check valve in the aircraft hydraulic valve of the above aspect opens even when relatively small pilot pressure is supplied to the valve opening component. Thus, the valve opening component appropriately opens the check valve even when the check valve includes an enlarged closed-side pressure receiving surface that receives the hydraulic pressure of the closed hydraulic pressure section.

The aspect of the present invention provides an aircraft hydraulic valve that does not have to be significantly enlarged even when increasing the amount of oil flowing in the hydraulic servomechanism.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1:
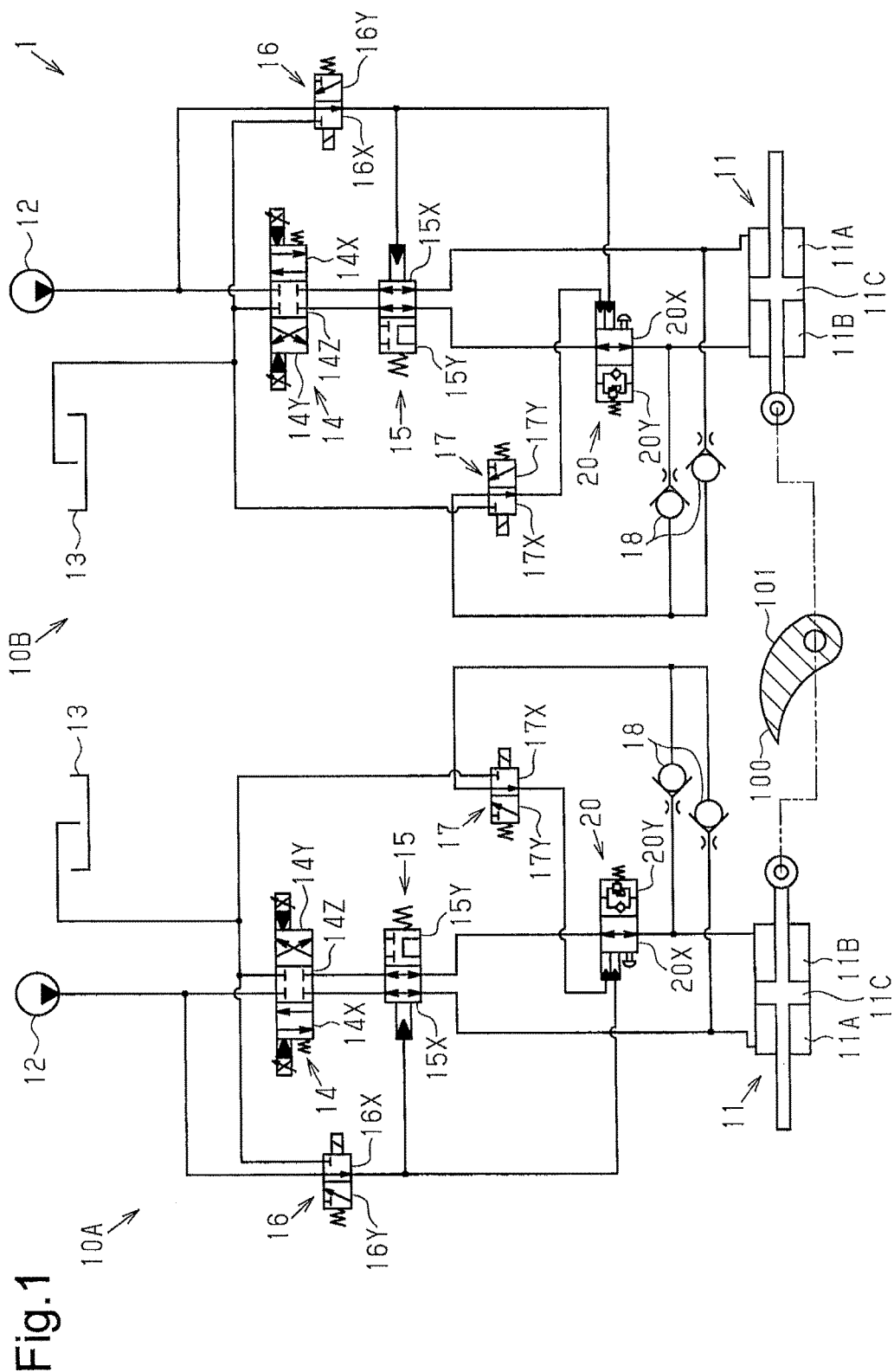
FIG. 1 is a schematic diagram of a hydraulic circuit of a flight control surface controller including a first embodiment of aircraft hydraulic valves.

A hydraulic control device 1, which is configured to control the angle of a flight control surface 101 of a wing 100 of an aircraft, will now be described with reference to FIG. 1.

The hydraulic control device 1 includes two systems of hydraulic servomechanisms 10A, 10B. The hydraulic servomechanisms 10A, 10B basically have the same hydraulic circuit. Thus, the hydraulic servomechanism 10A will be described below and the hydraulic servomechanism 10B will not be described. The hydraulic control device 1 may include three or more systems of hydraulic servomechanisms.

The hydraulic servomechanism 10A includes a hydraulic actuator 11, which drives the flight control surface 101, a hydraulic pressure source 12, which supplies oil to the hydraulic actuator 11, and a reservoir 13, which stores oil discharged from the hydraulic actuator 11. The hydraulic actuator 11, the hydraulic pressure source 12, and the reservoir 13 are coupled by oil channels.

The hydraulic actuator 11 includes a piston 11C, which controls the flight control surface 101, and a first hydraulic chamber 11A and a second hydraulic chamber 11B, which are separated by the piston 11C.

To control the flow of oil in the oil channels, a control valve 14, a switch valve 15, a first electromagnetic valve 16, a second electromagnetic valve 17, two check valves 18, and a hydraulic valve 20 are arranged between the hydraulic actuator 11 and one of the hydraulic pressure source 12 and the reservoir 13. The control valve 14, the first electromagnetic valve 16, and the second electromagnetic valve 17 may be controlled by a hydraulic controller, which is not shown.

The control valve 14 is coupled to the hydraulic pressure source 12 and the reservoir 13. The control valve 14 may be shifted to a first communication position 14X, in which oil is supplied to the first hydraulic chamber 11A and discharged from the second hydraulic chamber 11B, a second communication position 14Y, in which oil is discharged from the first hydraulic chamber 11A and supplied to the second hydraulic chamber 11B, and an interruption position 14Z, in which the supply and discharge of oil to and from each of the hydraulic chambers 11A, 11B are interrupted. The control valve 14 is, for example, a solenoid valve.

The switch valve 15 is coupled to the first hydraulic chamber 11A, the control valve 14, and the first electromagnetic valve 16. The switch valve 15 may be shifted to one of a communication position 15X and a bypass position 15Y based on the hydraulic pressure from the first electromagnetic valve 16. The switch valve 15 is set in the communication position 15X to communicate the two hydraulic chambers 11A, 11B with the control valve 14. The switch valve 15 is set in the bypass position 15Y to communicate the hydraulic chambers 11A, 11B with each other without using the control valve 14.

The first electromagnetic valve 16 is coupled to the hydraulic pressure source 12, the reservoir 13, and the hydraulic valve 20. The first electromagnetic valve 16 may be shifted to a supply position 16X and an interruption position 16Y. When the first electromagnetic valve 16 is set in the supply position 16X, the hydraulic pressure is supplied from the hydraulic pressure source 12 to the hydraulic valve 20. When the first electromagnetic valve 16 is set in the interruption position 16Y, the hydraulic pressure of the hydraulic pressure source 12 is not supplied to the hydraulic valve 20. The first electromagnetic valve 16 is, for example, a solenoid valve.

The second electromagnetic valve 17 is coupled to the hydraulic chambers 11A, 11B, the reservoir 13, and the hydraulic valve 20. The second electromagnetic valve 17 may be shifted to a supply position 17X and an interruption position 17Y. When the second electromagnetic valve 17 is set in the supply position 17X, the hydraulic pressure, which is returned from the hydraulic chambers 11A, 11B, is supplied to the hydraulic valve 20. When the second electromagnetic valve 17 is set in the interruption position 17Y, the hydraulic pressure, which is returned from the hydraulic chambers 11A, 11B, is not supplied to the hydraulic valve 20. The second electromagnetic valve 17 is, for example, a solenoid valve.

The two check valves 18 are set in oil channels between the second electromagnetic valve 17 and the hydraulic chambers 11A, 11B, respectively. Each check valve 18 allows oil to flow from the corresponding one of the hydraulic chambers 11A, 11B to the second electromagnetic valve 17 and restricts the flow of oil from the second electromagnetic valve 17 to the corresponding one of the hydraulic chambers 11A, 11B.

The hydraulic valve 20 is coupled to the second hydraulic chamber 11B, the switch valve 15, and the electromagnetic valves 16, 17. The hydraulic valve 20 may be shifted to a communication position 20X and an interruption position 20Y. When the hydraulic valve 20 is set in the communication position 20X, the second hydraulic chamber 11B and the switch valve 15 communicate due to the hydraulic pressure (pilot hydraulic pressure) of one of the oil channels coupled to the electromagnetic valves 16, 17. When the hydraulic valve 20 is set in the interruption position 20Y, the communication is interrupted between the second hydraulic chamber 11B and the switch valve 15. When the hydraulic valve 20 is set in the interruption position 20Y and the hydraulic pressure of the second hydraulic chamber 11B becomes a predetermined value or greater, the hydraulic valve 20 functions as a relief valve, which discharges oil from the second hydraulic chamber 11B to the switch valve 15.

The operation of the hydraulic control device 1 will now be described.

(a) Hydraulic Servomechanisms 10A, 10B Both Normal

The hydraulic servomechanisms 10A, 10B operate in the same manner. More specifically, when the first electromagnetic valve 16 of each hydraulic servomechanism is energized and set in the supply position 16X, the hydraulic pressure is supplied from the hydraulic pressure source 12 to the switch valve 15 and the hydraulic valve 20. When the hydraulic pressure is supplied, the switch valve 15 is set in the communication position 15X and the hydraulic valve 20 is set in the communication position 20X.

When the control valve 14 is set in the first communication position 14X, the oil is supplied from the hydraulic pressure source 12 to the first hydraulic chamber 11A through the control valve 14 and the switch valve 15. Also, the oil is discharged from the second hydraulic chamber 11B to the reservoir 13 through the hydraulic valve 20, the switch valve 15, and the control valve 14. This expands the first hydraulic chamber 11A and contracts the second hydraulic chamber 11B. As a result, the flight control surface 101 is moved upward.

When the control valve 14 is set in the second communication position 14Y, the oil is supplied from the hydraulic pressure source 12 to the second hydraulic chamber 11B through the control valve 14, the switch valve 15, and the hydraulic valve 20. Also, the oil is discharged from the first hydraulic chamber 11A to the reservoir 13 through the switch valve 15 and the control valve 14. This expands the second hydraulic chamber 11B and contracts the first hydraulic chamber 11A. As a result, the flight control surface 101 is moved downward.

(b) Hydraulic Servomechanism 10A Broken and Hydraulic Servomechanism 10B Normal

In each hydraulic servomechanism, the energization of the solenoid in the first electromagnetic valve 16 is terminated, and the first electromagnetic valve 16 is set in the interruption position 16Y. Thus, the hydraulic pressure is not supplied from the hydraulic pressure source 12 to the switch valve 15 and the hydraulic valve 20. However, the solenoid in the second electromagnetic valve 17 is energized and set in the supply position 17X. Thus, the hydraulic pressure can be supplied from one of the hydraulic chambers 11A, 11B to the hydraulic valve 20. Breakdown of the hydraulic servomechanism 10A is, for example, a state in which the oil is not supplied due to breakdown of the hydraulic pressure source 12.

The hydraulic actuator 11 of the hydraulic servomechanism 10A may operate in correspondence with the operation of the hydraulic actuator 11 of the hydraulic servomechanism 10B. In this case, in the hydraulic servomechanism 10A, the hydraulic pressure of one of the hydraulic chambers 11A, 11B is supplied to the hydraulic valve 20 through the second electromagnetic valve 17, and the hydraulic valve 20 is set in the communication position 20X. Consequently, the hydraulic chambers 11A, 11B communicate via the bypass of the switch valve 15. Thus, the hydraulic actuator 11 of the hydraulic servomechanism 10A does not interfere with the operation of the hydraulic actuator 11 of the hydraulic servomechanism 10B.

(c) Hydraulic Servomechanisms 10A, 10B Both Broken

In each hydraulic servomechanism, the energization of the electromagnetic valves 16, 17 of is terminated. This sets the electromagnetic valves 16, 17 in the interruption positions 16Y, 17Y, respectively. As a result, the hydraulic pressure of the hydraulic pressure source 12 is not supplied to the switch valve 15 and the hydraulic valve 20. Thus, the hydraulic chambers 11A, 11B are each closed, and the flight control surface 101 is locked.

The structure of the hydraulic valve 20 will now be described with reference to FIG. 2.

The hydraulic valve 20 includes a housing 30. The housing 30 may be tubular and include an inner cavity 36 defined by a through hole extending through the housing 30 in the longitudinal direction. The inner cavity 36 includes a first cavity 36A, which has a first inner diameter, and a second cavity 36B, which has a second inner diameter that is smaller than the first inner diameter.

Figure 2:
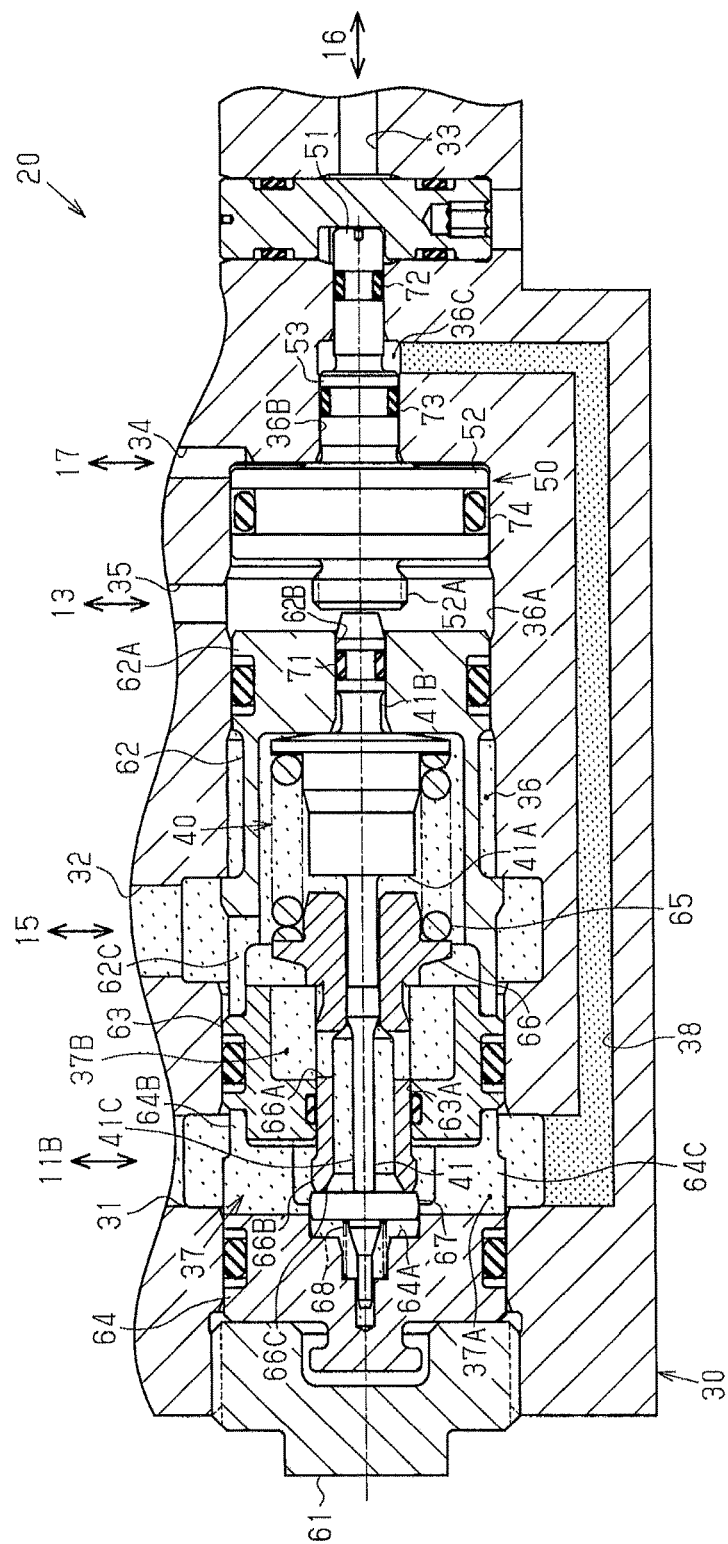
FIG. 2 is a cross-sectional view showing the aircraft hydraulic valve of the first embodiment.

In the description, hereafter, the left side of FIG. 2 may be referred to as the first end of the housing 30, the first end of the inner cavity 36, or the plug side. Also, the right side of FIG. 2 may be referred to as the second end of the housing 30 or the inner cavity 36.

The housing 30 includes five ports, which communicate the inner cavity 36 with the exterior, namely, a first port 31 communicated with the second hydraulic chamber 113, a second port 32 communicated with the switch valve 15, a third port 33 communicated with the first electromagnetic valve 16, a fourth port 34 communicated with the second electromagnetic valve 17, and a fifth port 35 communicated with the reservoir 13. The first port 31, the second port 32, the fourth port 34, and the fifth port 35 each extend in a direction orthogonal to the longitudinal direction of the housing 30. The first port 31, the second port 32, the fifth port 35, and the fourth port 34 are sequentially arranged from the first end toward the second end of the inner cavity 36. The third port 33 extends in the longitudinal direction of the housing 30 and communicates with the second end of the inner cavity 36. The cross-sectional passage area of the first port 31 and the second port 32 is larger than that of the third port 33 to the fifth port 35.

The housing 30 is provided with an opening that is arranged in the first end and blocked by a plug 61. The inner cavity 36 accommodates a valve support 64, a seat support 63, a plunger holder 62, and a valve opening component 40 sequentially from the first end toward the second end. The valve opening component 40 may be a set of a plunger 41 and a pilot piston 50.

The plunger holder 62 is fixed between the second port 32 and the fifth port 35 in the inner cavity 36 of the housing 30. The plunger holder 62 is cup-shaped and opens toward the plug 61. The plunger holder 62 includes a bottom portion 62A provided with a plunger support hole 62B. The plunger holder 62 includes a cutaway portion 62C, which is opposed to the second port 32.

The seat support 63 is joined to an open end of the plunger holder 62. The seat support 63 is cup-shaped and opens toward the plunger holder 62. The seat support 63 is fixed between the first port 31 and the second port 32 in the inner cavity 36 of the housing 30. The seat support 63 includes a plug-side end portion or a plug-side wall provided with a seat support hole 63A.

The valve support 64 is in contact with the plug 61. The valve support 64 is cup-shaped and opens toward the seat support 63. The valve support 64 is fixed between the plug 61 and the first port 31 in the inner cavity 36 of the housing 30. The valve support 64 is provided with a support hole 64A. Although not shown in the drawings, an open end of the valve support 64 is joined to the plug-side end portion of the seat support 63. The valve support 64 includes a first cutaway portion 64B, which is opposed to the first port 31. The valve support 64 includes a second cutaway portion 64C, which is radially opposed to the first cutaway portion 64B.

The plunger holder 62, the seat support 63, and the valve support 64 define an oil channel 37 (light shading portion in FIG. 2), which connects the first port 31 and the second port 32, in the inner cavity 36. The oil channel 37 accommodates the plunger 41, a plunger pressing spring 65, a valve seat 66, a check valve 67, and a valve pressing spring 68.

The plunger 41 includes a tubular base 41A, a support shaft 41B extending from the base 41A to a side opposite to the plug 61, and a pushing rod 41C extending from the base 41A toward the plug 61. When the support shaft 41B is inserted into the plunger support hole 62B of the plunger holder 62 and the base 41A is in contact with the bottom portion 62A of the plunger holder 62, the plunger 41 is held by the plunger holder 62. A seal 71 such as an O-ring is attached to the support shaft 41B of the plunger 41. The seal 71 separates the oil channel 37 from a gap formed in the inner cavity 36 between the plunger holder 62 and the pilot piston 50. The plunger pressing spring 65, which presses the plunger 41 against the bottom portion 62A of the plunger holder 62, is attached to the base 41A. The valve seat 66, which is, for example, tubular, is supported by the pushing rod 41C and slidable in the axial direction of the pushing rod 41C. The plunger pressing spring 65 is compressed and held by the base 41A and the valve seat 66.

The valve seat 66 may be tubular and contact the check valve 67. The valve seat 66 is fitted in the seat support hole 63A of the seat support 63 and projects from the seat support 63 toward the check valve 67. When the valve seat 66 contacts an open end of the seat support 63, which is oriented toward the plug 61, movement of the valve seat 66 is restricted toward the plug 61. The outer circumferential surface of the valve seat 66 is partially spaced apart by a gap and opposed to the inner circumferential surface of the seat support 63, which is located closer to the plunger holder 62 than the seat support hole 63A. The gap, which defines a portion of the oil channel 37, is in communication with the second port 32. The valve seat 66 is provided with a plurality of communication holes 66A. The communication holes 66A communicate the interior of the valve seat 66 with the above gap, which is located outside the valve seat 66. The valve seat 66 includes an open end, which is blocked when contacting the check valve 67. The outer surface of the open end of the valve seat 66 includes a large diameter portion 66B having a larger outer diameter than the seat support hole 63A of the seat support 63. The inner surface of the open end of the valve seat 66 includes an inclined surface 66C having a diameter that increases toward the open edge of the valve seat 66.

The check valve 67 is opposed to the open end of the valve seat 66 in the longitudinal direction of the housing 30. The check valve 67 is configured to interrupt the communication of the first port 31 and the second port 32 in the oil channel 37. More specifically, when the check valve 67 contacts the valve seat 66 and is closed, the oil channel 37 is separated into a closed hydraulic pressure section 37A, which is located between the check valve 67 and the first port 31, and an open hydraulic pressure section 37B, which is located between the check valve 67 and the second port 32. The valve pressing spring 68, which presses the check valve 67 toward the valve seat 66, is located between the check valve 67 and the valve support 64. The valve pressing spring 68 and a portion of the check valve 67 are accommodated in the support hole 64A of the valve support 64.

The pilot piston 50, which pushes the plunger 41, is located between the plunger holder 62 and the third port 33 in the inner cavity 36. In the present embodiment, in the inner cavity 36, a cavity between the plunger holder 62 and the third port 33 may be referred to as the surrounding cavity of the valve opening component 40.

It is preferred that the pilot piston 50 be a single member and, for example, a multi-step piston having a plurality of diameters. In the illustrated example, the pilot piston 50 includes a pilot driving piston 51, a bypass driving piston 52, and an auxiliary driving piston 53. The pilot driving piston 51, the auxiliary driving piston 53, and the bypass driving piston 52 respectively have diameters that increase in this order. The bypass driving piston 52, the auxiliary driving piston 53, and the pilot driving piston 51 are arranged to be farther from the plug 61 (check valve 67) in this order.

The pilot driving piston 51 is inserted in the third port 33. A seal 72, which is attached to the pilot driving piston 51, separates the third port 33 and the second cavity 36B of the inner cavity 36.

The auxiliary driving piston 53 is inserted in the second cavity 36B. The seal 72 of the pilot driving piston 51 and a seal 73, which is attached to the auxiliary driving piston 53, define an auxiliary cavity 36C, which is a portion of the second cavity 36B and closed.

The auxiliary driving piston 53 includes a pressure receiving surface, which receives the hydraulic pressure of the auxiliary cavity 36C. The check valve 67 includes a closed-side pressure receiving surface, which receives the hydraulic pressure of the closed hydraulic pressure section 37A. The area of the pressure receiving surface of the auxiliary driving piston 53 is set in accordance with the area of the closed-side pressure receiving surface of the check valve 67. For example, the area of the pressure receiving surface of the auxiliary driving piston 53 is set to compensate for the difference between force acting on the bypass driving piston 52 and force acting in a direction in which the check valve 67 closes due to the hydraulic pressure of the closed hydraulic pressure section 37A. The area of the pressure receiving surface of the auxiliary driving piston 53 normally corresponds to the diameter of the auxiliary driving piston 53.

The bypass driving piston 52 is accommodated in the first cavity 36A so that the bypass driving piston 52 and the plug 61 are located at opposite sides of the plunger holder 62. A pressing portion 52A projects from a plug-side surface of the bypass driving piston 52 toward the plunger 41. The support shaft 41B of the plunger 41 is spaced apart by a slight gap and opposed to an end surface of the pressing portion 52A. A seal 74, which is attached to the bypass driving piston 52, closely contacts the housing 30.

The pilot driving piston 51, the bypass driving piston 52, and the auxiliary driving piston 53 may each have any diameter. Additionally, the pilot driving piston 51, the bypass driving piston 52, and the auxiliary driving piston 53 may each be located in any position. For example, the auxiliary driving piston 53 may be located between the bypass driving piston 52 and the plug 61. Further, the pilot piston 50 may include four or more pistons.

The housing 30 also includes an auxiliary oil channel 38 (dark shading portion in FIG. 2). The auxiliary oil channel 38, which is in communication with the second cutaway portion 64C of the valve support 64, communicates with the closed hydraulic pressure section 37A. Also, the auxiliary oil channel 38 is in communication with the auxiliary cavity 36C. Thus, the auxiliary oil channel 38 supplies the hydraulic pressure from the closed hydraulic pressure section 37A to the auxiliary cavity 36C. The auxiliary oil channel 38 is located in a different position from the first port 31, the second port 32, the fourth port 34, and the fifth port 35 in the circumferential direction of the axis (single-dashed line in the drawing) of the housing 30. The auxiliary oil channel 38 corresponds to an auxiliary hydraulic pressure supply mechanism, which obtains the hydraulic pressure for opening the check valve 67 from the closed hydraulic pressure section 37A of the oil channel 37.

The auxiliary oil channel 38 may be formed by a tube attached to the housing 30. Additionally, the auxiliary oil channel 38 may have any shape. For example, the auxiliary oil channel 38 may be bellows-shaped or spiral.

Figure 3:
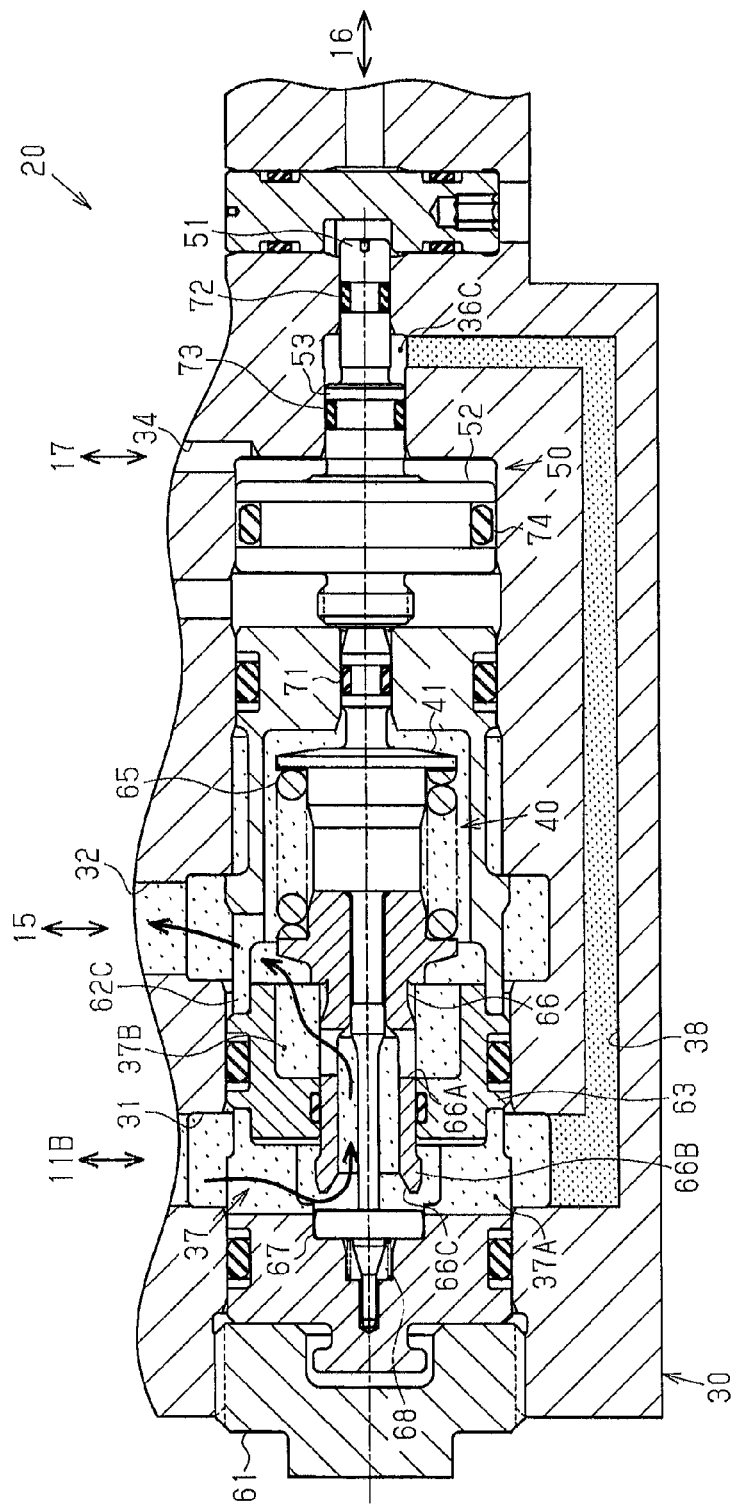
FIG. 3 is a cross-sectional view showing the aircraft hydraulic valve of FIG. 2 when a check valve is open.

The operation for opening the check valve 67 of the hydraulic valve 20 will now be described with reference to FIG. 3. FIG. 3 shows the hydraulic valve 20 when the hydraulic pressure of the closed hydraulic pressure section 37A is higher than that of the open hydraulic pressure section 37B.

When the hydraulic servomechanism 10A is broken and the hydraulic servomechanism 10B is normal (refer to FIG. 1), the hydraulic servomechanism 10B may operate the hydraulic actuator 11 so that the second hydraulic chamber 11B contracts in accordance with change in the flight control surface 101 (refer to FIG. 1). In this case, the second hydraulic chamber 11B of the hydraulic servomechanism 10A contracts in the same manner. This varies the hydraulic pressure of the second hydraulic chamber 11B of the hydraulic servomechanism 10A. The varied hydraulic pressure is supplied as pilot pressure to the bypass driving piston 52 through the check valve 18, the second electromagnetic valve 17, and the fourth port 34. At this time, the hydraulic pressure of the hydraulic pressure source 12 (refer to FIG. 1) is not supplied to the pilot driving piston 51 through the first port 31. Additionally, the hydraulic pressure is supplied from the auxiliary oil channel 38 to the auxiliary driving piston 53 as the pilot pressure. Thus, the pilot piston 50 is pushed toward the plunger 41. This moves the plunger 41 toward the plug 61 against the hydraulic pressure of the plunger pressing spring 65, the valve pressing spring 68, and the closed hydraulic pressure section 37A. Consequently, the plunger 41 pushes the check valve 67 toward the plug 61. When the check valve 67 is moved toward the plug 61 and separated from the valve seat 66, the check valve 67 opens. That is, the hydraulic valve 20 is shifted from the interruption position 20Y to the communication position 20X (refer to FIG. 1). Thus, as indicated by the bold arrows in FIG. 3, when the closed hydraulic pressure section 37A and the open hydraulic pressure section 37B communicate, the oil flows from the first port 31 to the second port 32 through the oil channel 37.

When the hydraulic servomechanisms 10A, 10B are both normal, the hydraulic pressure is supplied from the hydraulic pressure source 12 to the pilot driving piston 51 of the pilot piston 50 through the first port 31. Additionally, the hydraulic pressure is supplied from the auxiliary oil channel 38 to the auxiliary driving piston 53. Consequently, as described above, when the check valve 67 opens, the hydraulic valve 20 is shifted from the interruption position 20Y to the communication position 20X. Thus, the oil flows from the first port 31 to the second port 32 through the oil channel 37.

The hydraulic valve 20 of the present embodiment has the advantages described below.

(1) The hydraulic valve 20 includes the auxiliary oil channel 38, which is in communication with the closed hydraulic pressure section 37A and the auxiliary cavity 36C. The auxiliary oil channel 38 functions as the auxiliary hydraulic pressure supply mechanism, which obtains the hydraulic pressure for opening the check valve 67 from the closed hydraulic pressure section 37A of the oil channel 37. Consequently, the hydraulic pressure is applied from the closed hydraulic pressure section 37A to the auxiliary driving piston 53 through the auxiliary oil channel 38. Thus, the check valve 67 opens even when the pilot pressure supplied to the pilot piston 50 is small as compared to a hydraulic valve that lacks the auxiliary hydraulic pressure supply mechanism. Therefore, even when the pressure receiving area of the check valve 67, which is located at the side of the closed hydraulic pressure section 37A, is enlarged, the valve opening component 40 appropriately opens the check valve 67.

(2) Since the auxiliary oil channel 38 is in communication with the pilot piston 50, the hydraulic oil may be supplied from the closed hydraulic pressure section 37A to a portion of the pilot piston 50 that is selected during the designing of the hydraulic valve. This allows for adjustment in the amount of force acting on the pilot piston 50 based on the hydraulic pressure obtained from the closed hydraulic pressure section 37A. Thus, the structure of the auxiliary oil channel 30 may be flexibly designed so that the valve opening component 40 appropriately opens the check valve 67.

(3) Since the pilot piston 50 includes a plurality of pistons, namely, the pilot driving piston 51, the bypass driving piston 52, and the auxiliary driving piston 53, the pressure receiving area of each piston may be independently set. This allows for adjustment in the amount of force acting on the valve opening component 40 based on the hydraulic pressure obtained from the closed hydraulic pressure section 37A. Thus, the structure of the pilot piston 50 may be flexibly designed so that the valve opening component 40 appropriately opens the check valve 67.

(4) The pilot piston 50 includes three pistons, namely, the pilot driving piston 51, the bypass driving piston 52, and the auxiliary driving piston 53. This minimizes the difference in the overall length between the pilot piston 50 and a conventional pilot piston including two pistons, namely, a pilot driving piston and a bypass driving piston.

(5) The diameter of the pilot driving piston 51, the diameter of the auxiliary driving piston 53, and the diameter of the bypass driving piston 52 increase in this order. Accordingly, the second cavity 36B, which accommodates the pilot piston 50, is narrower at a location farther from the plug 61 and wider at a location closer to the plug 61. Thus, the second cavity 36B may be easily formed.

(6) As the pressure receiving area of the check valve 67, which is located at the side of the closed hydraulic pressure section 37A, becomes larger, the force acting in the direction, in which the check valve 67 closes, increases. Thus, even when the hydraulic pressure is obtained from the closed hydraulic pressure section 37A and supplied to the pilot piston 50, the force for opening the check valve 67 would not be sufficiently assisted if the pressure receiving area of the auxiliary driving piston 53 is not balanced with the pressure receiving area of the check valve 67, which is located at the side of the closed hydraulic pressure section 37A. However, in the hydraulic valve 20 of the present embodiment, the pressure receiving area of the auxiliary driving piston 53 is set in accordance with the pressure receiving area of the check valve 67, which is located at the side of the closed hydraulic pressure section 37A. Thus, the hydraulic pressure obtained from the closed hydraulic pressure section 37A may be used to easily assist the opening of the check valve 67.

(7) Based on the pilot pressure supplied to the bypass driving piston 52, the force acts to drive the bypass driving piston 52 in a direction in which the check valve 67 opens. However, when the first hydraulic chamber 11A and the second hydraulic chamber 11B communicate via the bypass, the amount of the pilot pressure supplied to the bypass driving piston 52 varies in accordance with the load acting on the wing 100. If the pressure receiving area of the auxiliary driving piston 53 is set based on the relationship with the pressure receiving area of the check valve 67, which is located at the side of the closed hydraulic pressure section 37A, without properly estimating the degree of decreases in the pilot pressure, the force for opening the check valve 67 would be insufficient. In this regard, the pressure receiving area of the auxiliary driving piston 53 is set to compensate for the difference between the force acting on the bypass driving piston 52 and the force acting in a direction in which the check valve 67 closes. Thus, the pilot piston 50 is apt to appropriately open the check valve 67.

(8) The inclined surface 66C is formed on the plug-side open end of the valve seat 66. Thus, the open area is enlarged in the plug-side end portion of the valve seat 66. This allows a large amount of the oil to flow from the first port 31 into the valve seat 66 when the check valve 67 opens.

In particular, the large diameter portion 66B is formed in the plug-side end portion of the valve seat 66. Thus, the open area of the plug-side end portion of the valve seat 66 including the inclined surface 66C is further enlarged. This allows a larger amount of the oil to flow from the first port 31 into the valve seat 66.

(9) The gap is formed between the inner circumferential portion of the seat support 63 and the outer circumferential portion of the valve seat 66, defining a portion of the oil channel 37. The valve seat 66 is provided with the communication holes 66A, which are in communication with the gap. Thus, the oil is apt to flow from the valve seat 66 to the second port 32 through the communication holes 66A.

Figure 4:
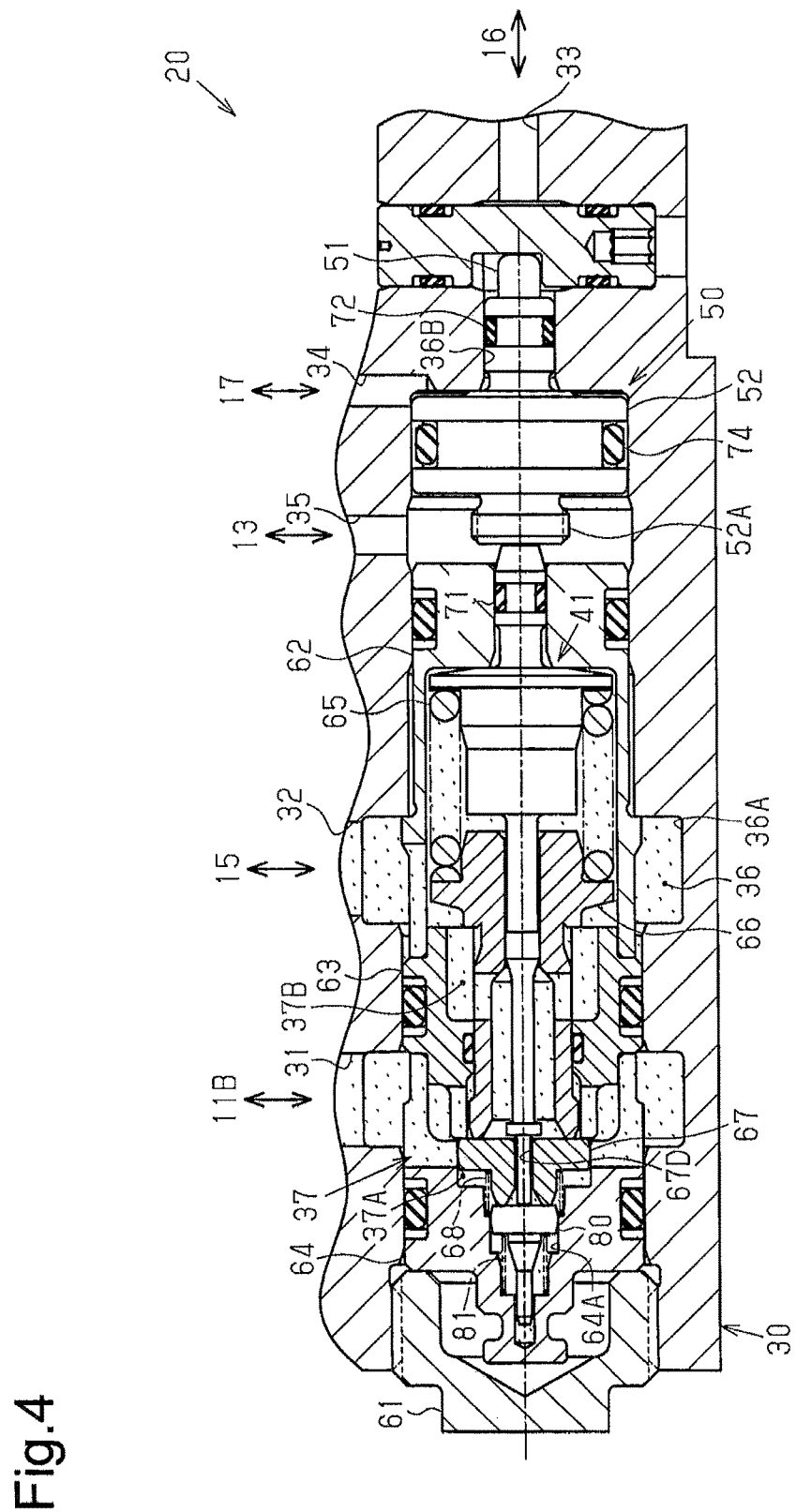
FIG. 4 is a cross-sectional view showing a second embodiment of an aircraft hydraulic valve.
Figure 5:
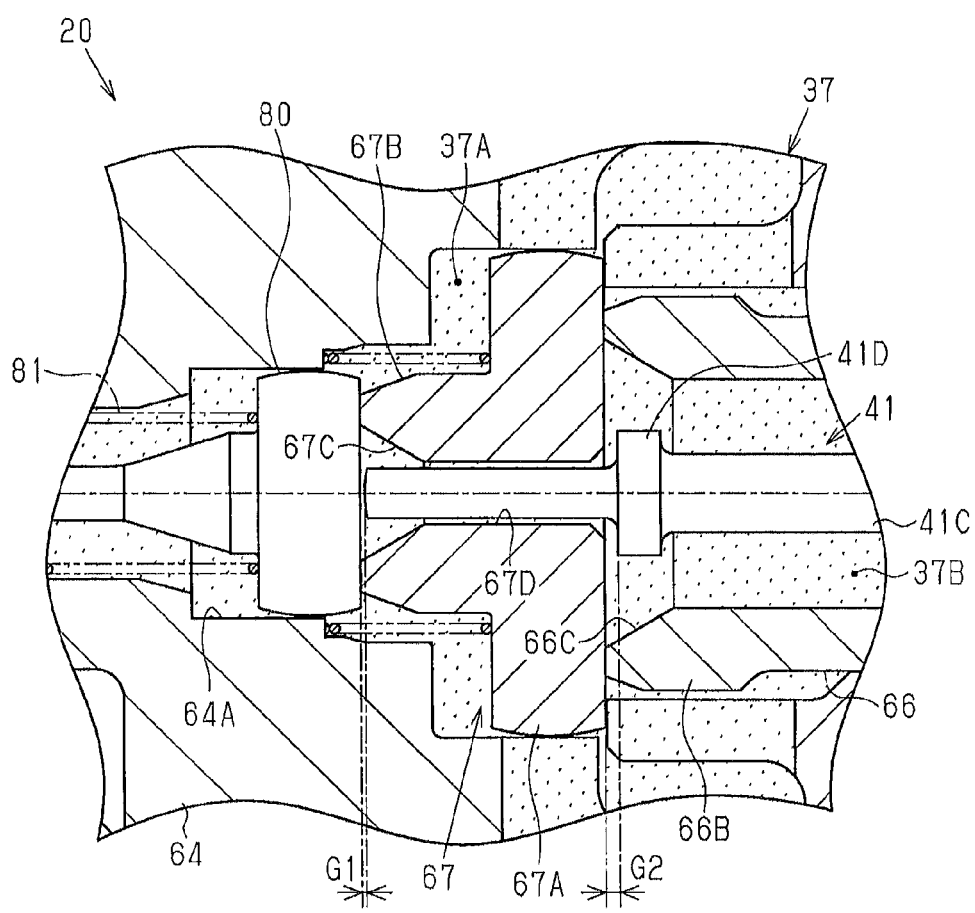
FIG. 5 is an enlarged view showing the check valve of FIG. 4.

With reference to FIGS. 4 to 6, a second embodiment of the hydraulic valve 20 will now be described focusing on the differences from the first embodiment. The hydraulic valve 20 of the second embodiment differs from that of the first embodiment in the structure of the auxiliary hydraulic pressure supply mechanism.

As shown in FIG. 4, instead of or in addition to the auxiliary oil channel 38 of the first embodiment, the auxiliary hydraulic pressure supply mechanism of the hydraulic valve 20 of the second embodiment includes a pressure reducing valve 80 and a pressing spring 81.

As shown in FIG. 5, the check valve 67 includes a valve body 67A, which closes the valve seat 66, and an annular extension 67B, which projects from the valve body 67A toward the plug 61 (refer to FIG. 4) in the axial direction. The outer diameter of the annular extension 67B is smaller than that of the valve body 67A. The annular extension 67B includes an inclined inner surface 67C, which is tapered as extending away from a distal surface of the annular extension 67B. The check valve 67 is provided with a check valve bore 67D, which extends through the valve body 67A and the annular extension 67B to communicate the closed hydraulic pressure section 37A with the open hydraulic pressure section 37B of the oil channel 37. The check valve bore 67D is included in the auxiliary hydraulic pressure supply mechanism.

The pressure reducing valve 80 is configured to open and close the check valve bore 67D. The pressing spring 81 presses the pressure reducing valve 80 toward the check valve 67. The pressure reducing valve 80 and the pressing spring 81 are located between the check valve 67 and the plug 61 and accommodated in the support hole 64A of the valve support 64. The pressure receiving area of the pressure reducing valve 80 is smaller than that of the check valve 67. The pressure reducing valve 80 is a check valve. Alternatively, the pressure reducing valve 80 may be a gate valve, a globe valve, a ball valve, or a butterfly valve.

The pushing rod 41C of the plunger 41 is inserted into the check valve bore 67D. A projection 41D is formed on the pushing rod 41C and has a larger outer diameter than that of the pushing rod 41C. When the check valve 67 is closed by the pressure reducing valve 80, the gap G1 is formed between the distal surface of pushing rod 41C and the pressure reducing valve 80, and the gap G2 is formed between the projection 41D and the check valve 67. As shown in FIG. 5, the gap G2 is larger than the gap G1.

The operation of the hydraulic valve 20 will now be described with reference to FIG. 6.

Figure 6A:
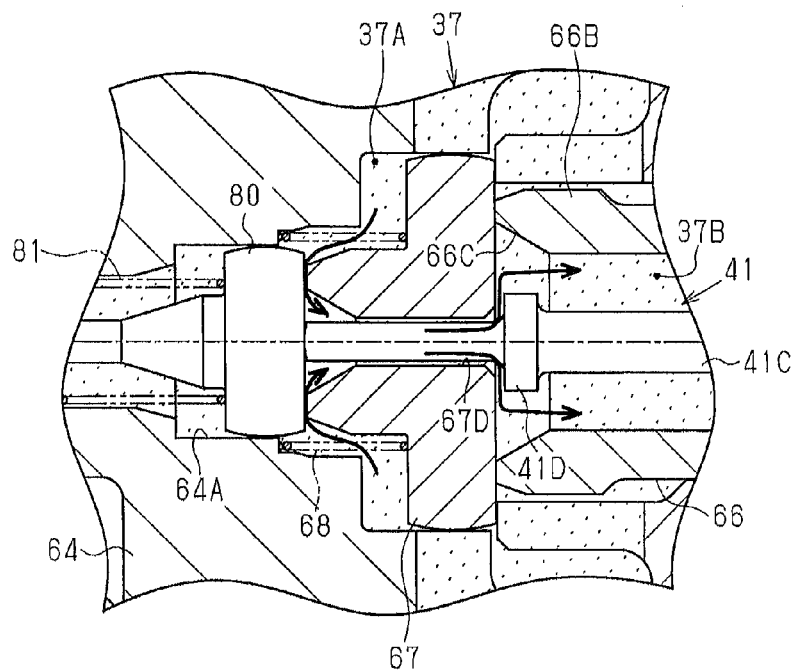
FIGS. 6A and 6B are cross-sectional views showing the aircraft hydraulic valve of FIG. 4 when the check valve is closed and open, respectively.
Figure 6B:
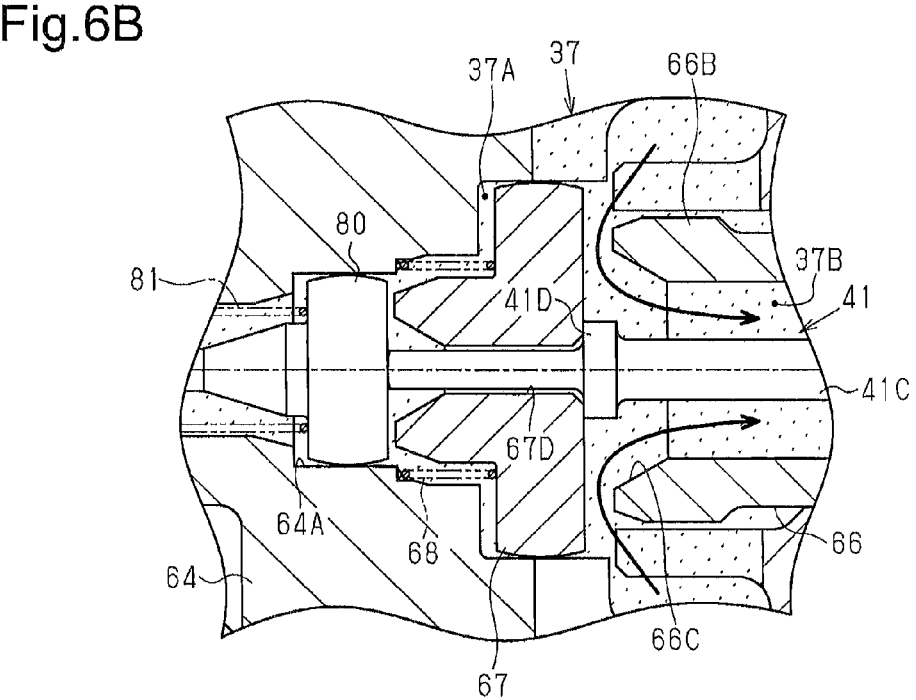

As shown in FIG. 6A, when the pilot piston 50 (refer to FIG. 4) pushes the plunger 41, the pushing rod 41C pushes the pressure reducing valve 80. This moves the pressure reducing valve 80 toward the plug 61 (refer to FIG. 4) and separates the pressure reducing valve 80 from the check valve 67. Thus, as indicated by the bold arrows in FIG. 6A, the oil flows from the closed hydraulic pressure section 37A of the oil channel 37 to the open hydraulic pressure section 37B through the check valve bore 67D. As a result, the difference in the hydraulic pressure is decreased between the closed hydraulic pressure section 37A and the open hydraulic pressure section 37B. Then, as shown in FIG. 6B, the projection 41D of the plunger 41 pushes the check valve 67 toward the plug 61. When the check valve 67 is moved toward the plug 61 and separated from the valve seat 66, the check valve 67 opens. Thus, as indicated by the bold arrows in FIG. 6B, the oil flows from the closed hydraulic pressure section 37A to the open hydraulic pressure section 37B through a gap between the check valve 67 and the valve seat 66.

The hydraulic valve 20 of the present embodiment has the advantages described below in addition to advantages (2) to (9) of the hydraulic valve 20 of the first embodiment.

(10) The hydraulic valve 20 includes the pressure reducing valve 80, which opens and closes the check valve 67 using the pushing rod 41C of the plunger 41. The pressure reducing valve 80 functions as the auxiliary hydraulic pressure supply mechanism, which obtains the hydraulic pressure for opening the check valve 67 from the closed hydraulic pressure section 37A of the oil channel 37. The plunger 41 pushes the pressure reducing valve 80, which has a smaller pressure receiving area than that of the check valve 67. This decreases the force applied to the check valve 67 in a direction in which the valve seat 66 closes. Thus, the check valve 67 opens even when the pilot pressure supplied to the pilot piston 50 is small as compared to a hydraulic valve that lacks the auxiliary hydraulic pressure supply mechanism. Therefore, even when enlarging the pressure receiving area of the check valve 67, which is located at the side of the closed hydraulic pressure section 37A, the valve opening component 40 appropriately opens the check valve 67.

(11) Additionally, the auxiliary hydraulic pressure supply mechanism decreases the length of the oil channel formed in the housing 30 compared to a structure in which the hydraulic pressure is supplied from the closed hydraulic pressure section 37A to the valve opening component 40. This limits increases in pressure loss.

(12) When the check valve 67 opens, the projection 41D formed on the pushing rod 41C moves to the plug side of the open portion of the valve seat 66. Thus, when the oil flows from the first port 31 to the valve seat 66, interference of the projection 41D with the oil flow is limited.

It should be apparent to those skilled in the art that the present invention may be embodied in many other specific forms without departing from the scope of the invention. Particularly, it should be understood that the present invention may be embodied in the following forms.

In the first embodiment, the auxiliary oil channel 38 is coupled to the pilot piston 50. However, the auxiliary oil channel 38 may be coupled to the plunger 41. For example, the auxiliary oil channel 38 may communicate the closed hydraulic pressure section 37A of the oil channel 37 (refer to FIG. 2) with the plunger support hole 623 of the plunger holder 62 (refer to FIG. 7). More specifically, the support shaft 41B of the plunger 41 is extended, and a seal 75 is attached to the distal portion of the support shaft 41B. The auxiliary oil channel 38 communicates with a section of the plunger support hole 62B between the seal 71 and the seal 75 of the support shaft 41B of the plunger 41. The section of the plunger support hole 62B between the seal 71 and the seal 75 of the support shaft 41B of the plunger 41 corresponds to a cavity formed around the valve opening component 40.

Figure 7:
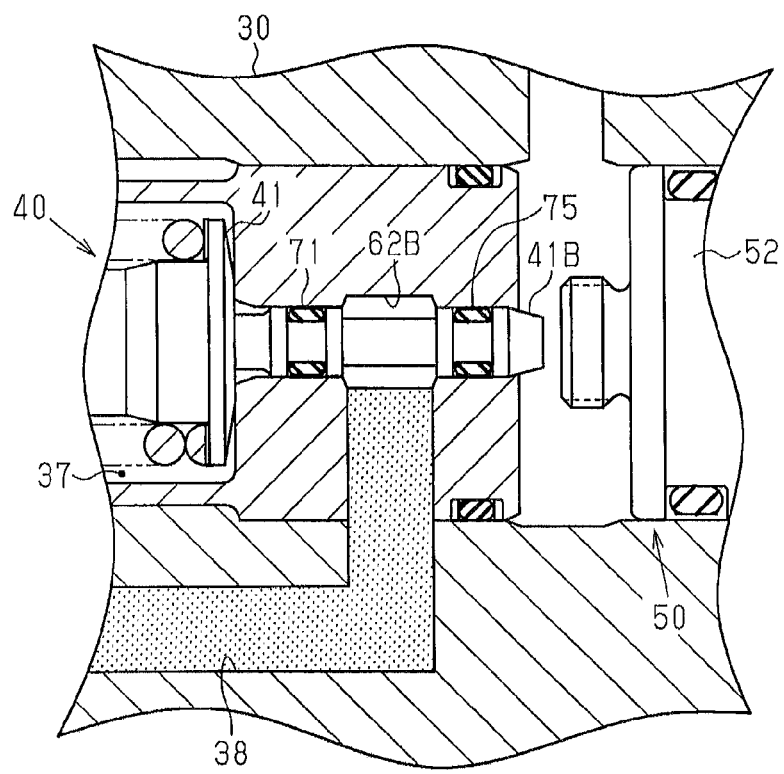
FIG. 7 is a cross-sectional view showing a plunger of a modified example of an aircraft hydraulic valve.

In the modified example of FIG. 7, the auxiliary oil channel 38 may branch and communicate with each of the plunger support hole 62B and the auxiliary cavity 36C. Alternatively, a plurality of auxiliary oil channels 38 may communicate with at least one of the plunger support hole 62B and the auxiliary cavity 36C. In other words, a plurality of auxiliary oil channels 38 may be formed.

In the first embodiment, the auxiliary oil channel 38 is coupled to the auxiliary driving piston 53. However, the auxiliary oil channel 38 may be coupled to at least one of the pilot driving piston 51 and the bypass driving piston 52. That is, the auxiliary oil channel 38 may be coupled to a plurality of portions of the pilot piston 50. In this case, the auxiliary oil channel 38 is coupled to the pilot piston 50 so that the pilot piston 50 pushes the plunger 41 due to the hydraulic pressure of the first hydraulic chamber 11A.

In the second embodiment, the projection 41D may be formed separately from the plunger 41. In this structure, an appropriate timing for opening the check valve 67 may be set by adjusting the coupling position of the projection 41D to the plunger 41.

In each of the above embodiments, the pilot piston 50 may have a structure in which a plurality of pistons are separately formed and then combined.

The above description is intended to be illustrative, and not restrictive. For example, the above-described examples (or one or more aspects thereof) may be used in combination with each other. For example, components of the first embodiments may be combined with components of the second embodiment. Other embodiments can be used, such as by one of ordinary skill in the art upon reviewing the above description. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description, with each claim standing on its own as a separate embodiment. The scope of the invention should be determined with reference to the appended claims, along with the full scope of equivalents to which such claims are entitled.

The invention claimed is:

1. An aircraft hydraulic valve operatively connected with a hydraulic actuator that is configured to drive a flight control surface, the hydraulic actuator comprising a first hydraulic chamber and a second hydraulic chamber, the aircraft hydraulic valve comprising:
   a housing comprising:
      a first port configured to communicate with the second hydraulic chamber of the hydraulic actuator that drives the flight control surface,
      a second port configured to communicate with a switch valve capable of communicating the first hydraulic chamber of the hydraulic actuator with the second hydraulic chamber of the hydraulic actuator via a bypass of the switch valve,
      an oil channel configured to connect the first port and the second port,
      a third port configured to communicate with a first electromagnetic valve;
      a fourth port configured to communicate with a second electromagnetic valve; and
      a fifth port configured to communicate with a reservoir;
   a check valve configured to interrupt a flow of oil from the first port to the second port in the oil channel of the housing;
   a valve opening component configured to open the check valve with pilot pressure supplied from the second hydraulic chamber of the hydraulic actuator; and
   an auxiliary hydraulic pressure supply mechanism configured to obtain hydraulic pressure, for opening the check valve, from a first hydraulic pressure section, wherein the first hydraulic pressure section is defined in the oil channel between the check valve and the first port,
   wherein the cross-sectional passage areas of the first port and the second port are larger than those of the third port, the fourth port, and the fifth port.

2. The aircraft hydraulic valve according to claim 1, wherein the auxiliary hydraulic pressure supply mechanism is configured to apply hydraulic pressure, obtained from the first hydraulic pressure section to the valve opening component.

3. The aircraft hydraulic valve according to claim 2, wherein the auxiliary hydraulic pressure supply mechanism includes an auxiliary oil channel formed in the housing,
   wherein the valve opening component includes a plurality of pistons, and
   wherein the auxiliary oil channel communicates the first hydraulic pressure section with a cavity formed around at least one of the plurality of pistons.

4. The aircraft hydraulic valve according to claim 3, wherein the auxiliary hydraulic pressure supply mechanism is configured to apply hydraulic pressure of the first hydraulic pressure section to at least one of the plurality of pistons.

5. The aircraft hydraulic valve according to claim 4, wherein the valve opening component includes
   a pilot driving piston that is configured to receive pilot pressure supplied from a hydraulic pressure source,
   a bypass driving piston that is configured to receive hydraulic pressure supplied through the switch valve, and
   an auxiliary driving piston that is configured to receive hydraulic pressure from the first hydraulic pressure section,
   wherein the auxiliary hydraulic pressure supply mechanism is configured to apply hydraulic pressure of the first hydraulic pressure section to the auxiliary driving piston.

6. An aircraft hydraulic valve operatively connected with a hydraulic actuator configured to drive a flight control surface, the hydraulic actuator comprising a first hydraulic chamber and a second hydraulic chamber, the aircraft hydraulic valve comprising:
   a housing that includes
      a first port adapted to communicate with the second hydraulic chamber of the hydraulic actuator that drives the flight control surface, a second port adapted to communicate with a switch valve capable of communicating the first hydraulic chamber of the hydraulic actuator with the second hydraulic chamber via a bypass, and an oil channel that connects the first port and the second port;

a check valve that interrupts a flow of oil from the first port to the second port in the oil channel of the housing;

a valve opening component configured to open the check valve with pilot pressure supplied from the second hydraulic chamber; and an auxiliary hydraulic pressure supply mechanism that obtains hydraulic pressure, for opening the check valve, from a first hydraulic pressure section, wherein the first hydraulic pressure section is defined in the oil channel between the check valve and the first port, wherein the auxiliary hydraulic pressure supply mechanism is configured to apply hydraulic pressure, obtained from the first hydraulic pressure section to the valve opening component, wherein the auxiliary hydraulic pressure supply mechanism includes an auxiliary oil channel formed in the housing, wherein the valve opening component includes a plurality of pistons, and wherein the auxiliary oil channel communicates the first hydraulic pressure section with a cavity formed around at least one of the plurality of pistons, wherein the auxiliary hydraulic pressure supply mechanism is configured to apply hydraulic pressure of the first hydraulic pressure section to at least one of the plurality of pistons, wherein the valve opening component includes a pilot driving piston, which receives pilot pressure supplied from a hydraulic pressure source, a bypass driving piston, which receives hydraulic pressure supplied through the switch valve, and an auxiliary driving piston, which receives hydraulic pressure from the first hydraulic pressure section, and wherein the auxiliary hydraulic pressure supply mechanism is configured to apply hydraulic pressure of the first hydraulic pressure section to the auxiliary driving piston, wherein the bypass driving piston, the auxiliary driving piston, and the pilot driving piston respectively have diameters that decrease in this order, and wherein the bypass driving piston, the auxiliary driving piston, and the pilot driving piston are arranged to be farther from the check valve in this order.

7. The aircraft hydraulic valve according to claim 5, wherein the check valve includes a closed-side pressure receiving surface that is configured receive pressure of the first hydraulic pressure section, and wherein the auxiliary driving piston has a pressure receiving area that is set in accordance with an area of the closed-side pressure receiving surface of the check valve.

8. The aircraft hydraulic valve according to claim 7, wherein the pressure receiving area of the auxiliary driving piston is set to compensate for a difference between force acting on the bypass driving piston and force acting in a direction in which the check valve closes.

9. The aircraft hydraulic valve according to claim 1, further comprising:

a check valve bore that extends through a valve body of the check valve, wherein the check valve bore communicates the first hydraulic pressure section with a second hydraulic pressure section that is defined in the oil channel between the check valve and the second port; and a valve configured to open and close the check valve bore.

* * * * *